United States Patent [19]

Lipp et al.

[11] Patent Number: 4,952,218
[45] Date of Patent: Aug. 28, 1990

[54] TWO-FLUID NOZZLE FOR ATOMIZING A LIQUID SOLID SLURRY AND PROTECTING NOZZLE TIP

[75] Inventors: Charles W. Lipp; Clifton T. Knight; Larry L. Lafitte, all of Baton Rouge; Marion H. Hunt, Brusly, all of La.

[73] Assignee: The Dow Chemical Company, Midland, Mich.

[21] Appl. No.: 238,217

[22] Filed: Aug. 26, 1988

[51] Int. Cl.$^5$ .................................................. C10J 3/48
[52] U.S. Cl. .............................. 48/86 R; 48/DIG. 7; 239/132.3; 239/397.5; 239/591
[58] Field of Search ............... 239/591, 397.5, 600, 239/428, 132.3, 427.5, 422, 419.3; 48/73, 77, 86 R, DIG. 7

[56] References Cited

U.S. PATENT DOCUMENTS

| | | | |
|---|---|---|---|
| 2,806,522 | 9/1957 | Stalego | 239/397.5 |
| 3,101,906 | 8/1963 | Webber | 239/600 |
| 3,129,777 | 4/1964 | Haspert | 239/600 |
| 3,698,646 | 10/1972 | Robba et al. | 239/591 |
| 4,221,336 | 9/1980 | Diamond | 239/600 |
| 4,443,228 | 4/1984 | Schlinger | 48/86 R |
| 4,443,230 | 4/1984 | Stellaccio | 48/197 R |
| 4,520,739 | 6/1985 | McCartney | 239/591 |
| 4,589,596 | 5/1986 | Stumpp et al. | 239/397.5 |
| 4,705,535 | 11/1987 | Lipp | 48/77 |
| 4,785,996 | 11/1988 | Ziecker et al. | 239/600 |

Primary Examiner—Peter Kratz

[57] ABSTRACT

A two-fluid nozzle for atomizing a liquid with a gas in which at least two conduits, a central and annular conduit, converge in an internal mixing zone for the liquid and gas, in which the nozzle has a central discharge orifice having a shoulder at its upstream end, and a two-piece, thermally resistant metal alloy heat shield for the central discharge orifice which the heat shield includes a retaining ring and an outwardly flaring liner for the outlet connected so that the retaining ring bears against the central outlet shoulder and is held in place by the flared construction at its downstream end, preferably the liner has heat conductive flexible packing disposed between its outside surface and the discharge orifice. The central discharge orifice may open into a protective cap which is cylindrical at one end and rounds out to an elliptical end surface.

10 Claims, 3 Drawing Sheets

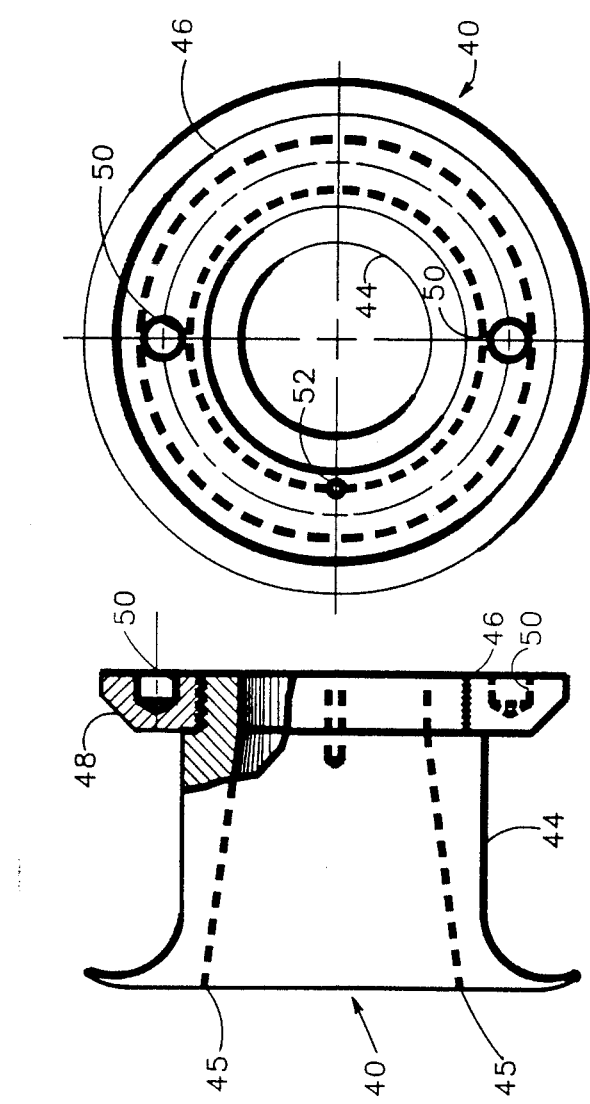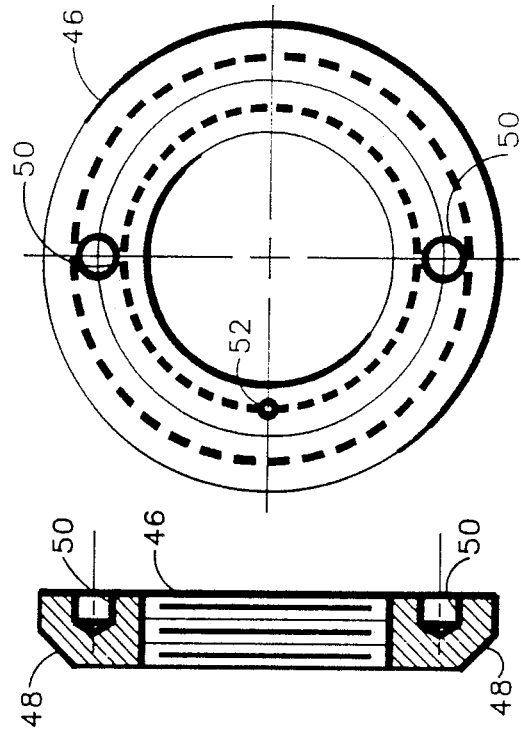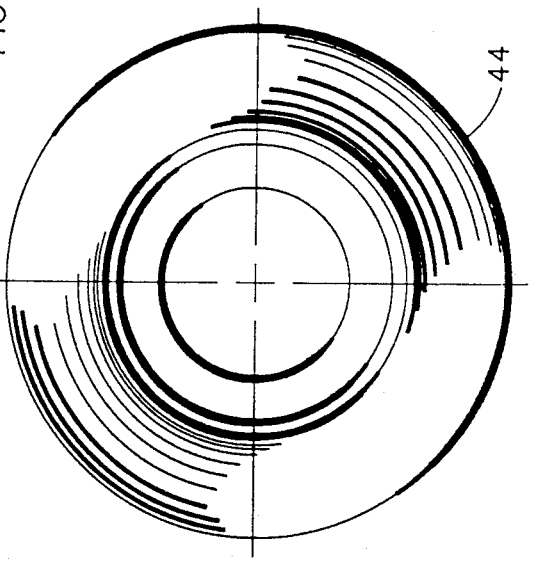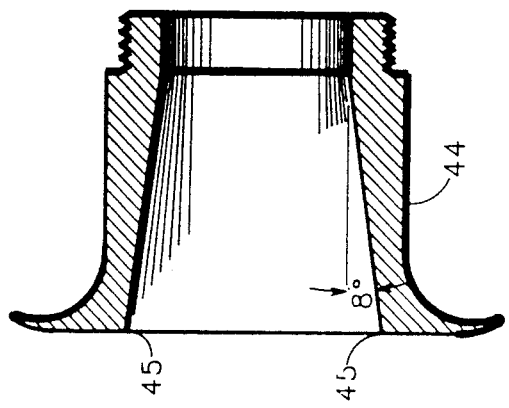

TWO-FLUID NOZZLE FOR ATOMIZING A LIQUID SOLID SLURRY AND PROTECTING NOZZLE TIP

BACKGROUND OF THE INVENTION

This invention relates to a two-fluid nozzle for atomizing a liquid with a gas which includes a protector for the nozzle tip. In many applications, such as boilers, furnaces and coal gasification reactors, the harsh combustion environment unduly shortens nozzle life. The tip of the burner nozzle is most especially subjected to the greatest thermal stress. Thermal stress is defined as the mechanical force caused by expansion because of an increase in temperature of a body or portion thereof. Especially at areas of high thermal gradient, for example, at the discharge outlet where the atomized fluids exit the nozzle into the furnace or combustion zone and the geometry of the nozzle changes from contacting internal temperatures to contacting combustion zone temperatures over a very short physical distance, thermal stress can be very large. Chemical reactions in the combustion zone, i.e., formation of soot, slag or the like also greatly affect the tip. Mechanical erosion, for example by slurries, also presents nozzle throat and tip problems. Some industries accept this as a fact of life and plan for frequent nozzle changes. Others, in order to extend nozzle life have fabricated inserts of materials which are more resistant to the stresses encountered for parts that are subjected to the most stress. For example, Schlinger, U.S. Pat. No. 4,443,228, has added inserts of refractory material, such as tungsten carbide or silicon carbide to decrease mechanical erosion at the nozzle tip caused by slurries. Unfortunately, such materials are expensive, difficult to fashion into complex shapes and can nevertheless fail.

The present invention seeks to provide a nozzle which is highly efficient in atomizing the gas-liquid mixture, and which is more stable and durable to the various stresses of the harsh environment of use without changing the burner configuration greatly, or increasing the difficulty of manufacture by working with exotic ceramic or refractory materials.

SUMMARY OF THE INVENTION

The present invention provides a burner nozzle assembly tip connected to the downstream end of a burner nozzle assembly in which at least one conduit is provided for a liquid comprising a carbonaceous material and at least one conduit is provided for an oxidizing gas, said conduits being concentric central and annular conduits, respectively, and which converge to provide efficient internal mixing for the liquid comprising carbonaceous material and for the oxidizing gas and pass the resultant mixture through a discharge orifice for combustion in a combustion zone at relatively high temperature, said nozzle tip comprising a discharge orifice which is a central outlet, having an upstream end, downstream end and having a shoulder at the upstream end of said outlet and a thermally resistant metal alloy heat shield having a retaining ring which is located upstream of said shoulder and in contact therewith and, connected to the retaining ring, a liner having an upstream end and a downstream end with the upstream end having a diameter less than the outlet and which diverges outwardly from the longitudinal axis of the central outlet and has a diameter larger than the upstream end of said outlet, whereby said outlet is at least partially covered by said liner and protects said outlet from the heat stress caused by the combustion temperature. The burner nozzle assembly tip is preferably of a heat resistant metal alloy, such as a nickel-ohromium-steel alloy and, more preferably, for example, Inconel alloys such as Incoloy 800H, Incoloy 800HT, Type 310 Stainless steel, or Incoloy MA956 (Incoloy is a trademark of INCO Alloys International, Inc.). Further, the space between the nozzle and the liner of the nozzle loan be packed with a compressible, heat- insulating material, such as, graphite, metal gauze, or tape packing. A preferred nozzle tip of this invention includes a two-piece heat shield in which the liner and retaining ring are threadedly connected and, more preferably, being unitized by a locking pin to prevent the parts from unscrewing and disengaging.

BRIEF DESCRIPTION OF THE DRAWINGS

The attached drawings which are included in this specification and form a part hereof, illustrate a specific, non-limiting embodiment of the invention. In each of the Figures of the Drawings, like numerals represent like parts

FIG. 2 is a partial sectional side view of the assembled liner and retaining ring in operating position relative to each other;

FIG. 3 is a rear view of the assembled liner and retaining ring shown in FIG. 2:

FIG. 4 is a sectional side view of the liner:

FIG. 5 is a rear view of the liner;

FIG. 6 is a sectional side retaining ring:

FIG. 7 is a rear view of the retaining ring: and

DETAILED DESCRIPTION OF PREFERRED EMBODIMENTS

The burner nozzle of this invention can be useful in any application requiring the use of a burner nozzle which is subject to the thermal, mechanical and chemical stresses of harsh environments, such as furnaces or coal gasification reactors in atomizing a two-fluid system, such as oxygen, air or oxygen-containing gas and liquid hydrocarbonaceous or solid carbonaceous slurried fuels. Although many other applications are known for the burner nozzle of this invention, the most severe environment appears to be that found in an entrained, slagging coal gasification reactor. Typical of such reactors are upflow systems. For purposes of illustration, a typical heat shield arrangement for such an environment will be more particularly described.

As described in coassigned U.S. Pat. No. 4,705,535, to Lipp, issued Nov. 10, 1987, a two-fluid nozzle which is adjustable to provide a substantially constant mixing energy is disclosed. For the purposes of that invention the nozzle is more specifically defined and includes a microprocessor to calculate the mixing energy from the pressure and mass flow values of the liquid and gas fed to the nozzle as measured by the appropriate sensing devices. U.S. Pat. No. 4,705,535 is hereby incorporated by reference herein, as if fully set forth.

The problem solved by the present invention is to prevent the burner face from failing by cracking because of thermal stress form the heat produced in the furnace or gasification reactor. This is accomplished by the protective tip or heat shield structure and the materials employed in the structure provided. The invention provides a tip for a burner nozzle such as that described in U.S. Pat. No. 4,705,535 and a shield or protecting tip which prevents direct contact and heat conduction for the burner assembly from the two-fluid mixture and its combustion products during combustion.

Figure 1:
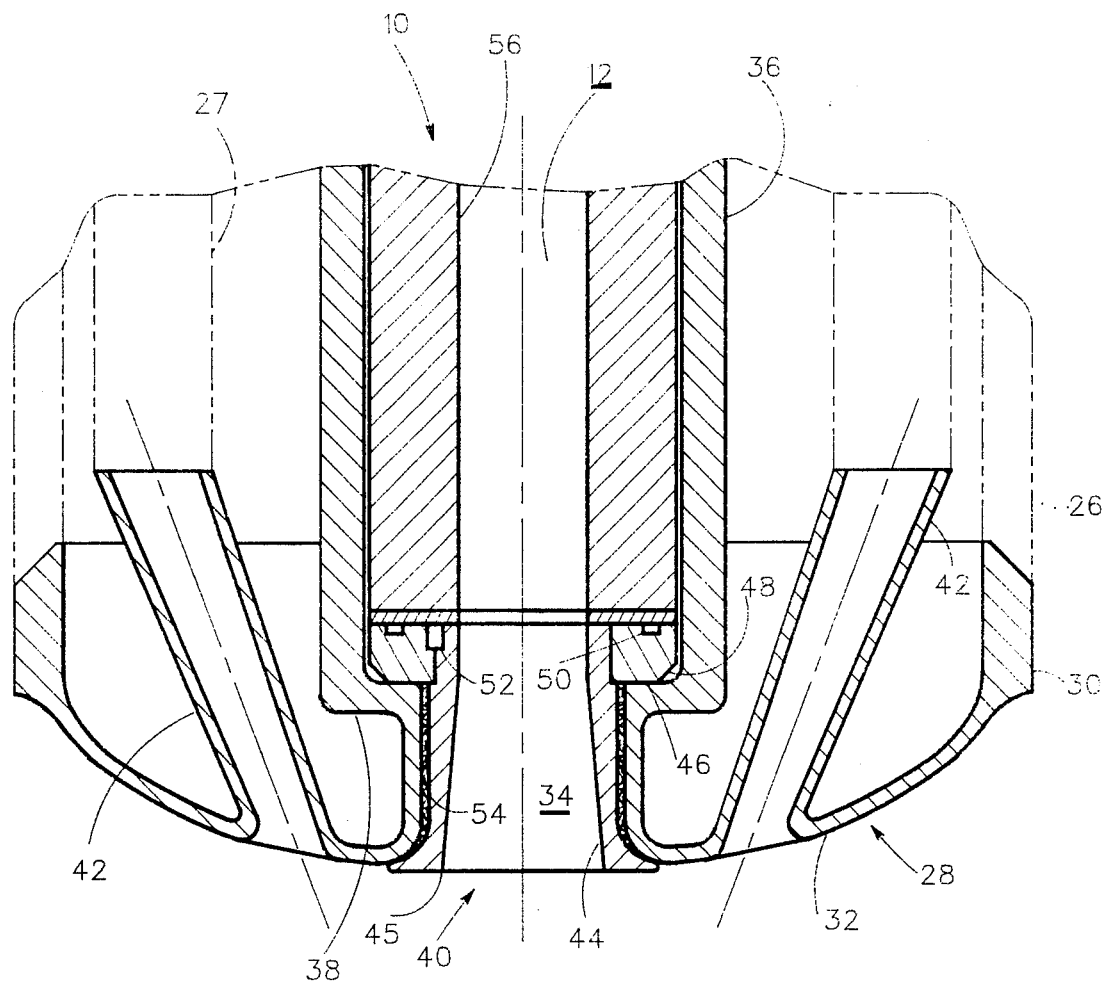
FIG. 1 is a sectional view of part of a two-fluid burner nozzle assembly tip having the heat shield of this invention in place and showing in phantom the downstream end of the burner nozzle assembly.
Figure 8:
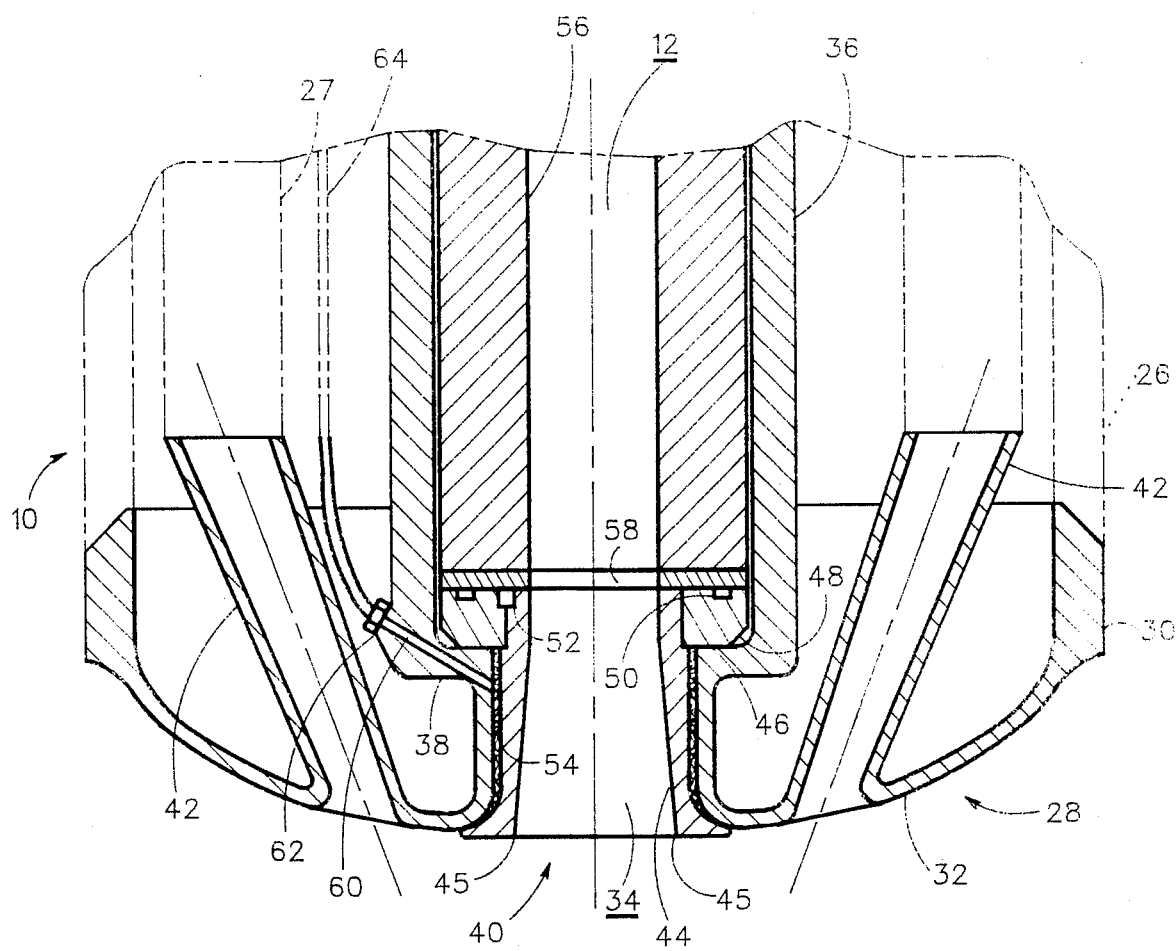
FIG. 8 is a sectional view of an alternative embodiment of a two-fluid burner nozzle assembly tip, having the heat shield additionally cooled by a gas stream.

As presently contemplated, the protecting tip is coaxial with the central longitudinal axis of the burner assembly and provides an unobstructed central conduit form the discharge orifice of the burner assembly to the reactor or furnace combustion zone. Generally, the protecting tip includes a cap portion and a heat shield portion. Because the nozzle cap and heat shield are attachable to the downstream end of the burner assembly a number of burners can be used with appropriate adaptation to the cap portion. Particularly, the cap portion must adapt to the cooling jacket of the burner nozzle assembly and, as shown in FIGS. 1 and 8, provide for fuel gas conduits to be used in preheat and heat maintenance conditions. Thus, prior art burners in addition to those described in U.S. Pat. No. 4,705,535, are useful without a great deal of adaptation required in the burner nozzle assembly. Therefore, the present invention is not limited to the described and incorporated reference burner of U.S. Pat. No. 4,705,535.

The coaxial shield conduit is encompassed and defined by a cylindrical tube or liner having an upstream end and a downstream end. The upstream end is adjacent to the burner discharge orifice while the downstream end opens to the reactor or furnace combustion zone. The liner or tube is preferably cylindrical in shape at the upstream end and diverges outwardly from the central longitudinal axis at its down stream end. Preferably, the heat shield liner ends abruptly in a sharp corner instead of continuing to flare outwardly in a smooth curve. This is to prevent the undue mixing of the highly atomized mixture of gas and liquid with hot recirculating reactor gas to prevent combustion adjaent the nozzle tip.

The length of the tube or liner is determined by the height of the cap portion and the size of the liner is determined by the amount of material required to flow through the liner. The degree of flare should be sufficient to cover the relatively sharp transition of the cap and burner nozzle from a central conduit axiallly aligned with the longitudinal axis of the burner assembly to an angle of 90° or more to the flat or rounded convex curve of the burner or cap face. It is at these sharp transitions that thermal and mechanical stresses occur with greater intensity. The highly localized stresses produced are more likely to cause failures in the burner or cap because of the intensified stresses. The liner may be composed of a thermally resistant metal alloy, a number of which are known. Typical of such thermally resistant alloys are nickel-chromium-steel alloys such as, Inconel alloys Incoloy 800HT, Incoloy MA956, Incoloy 800H, and Type 310 Stainless-Steel nickel chromium steel, to name a few major types (Incoloy is a trademark of INCO Alloys International, Inc., Huntington, W. Va.).

The liner is held in place by a retaining ring which is connected to the liner by any conventional means, such as threaded connection. When a threaded connection is used the liner and retaining ring are held together and prevented from unscrewing by drilling a small hole from the rear of the retaining ring into the intersecting thread and inserting a locking pin, as is conventional and known in the fastener industry for unitizing threaded connections. The retaining ring has an outside diameter larger than the liner and bears on a shoulder upstream of the liner at the point where the liner and retaining ring Join. The larger retaining ring thus prevents the shield from being blown into the furnace or gasifier with the two-fluid mixture.

The cap is a smoothly rounded or elliptical surface attached to the burner assembly face to provide for the water Jacket and to allow the burner internals to be easily fabricated, assembled and then covered so that these are not exposed to the combustion zone environment. The cap has matching conduits for each of the discharge orifices of the burner. Any method of attachment to the burner face can be employed, but it is preferred to weld the cap to the burner assembly.

As more specifically illustrated in the drawings, the protective tip 40 Is shown In FIG. 1 with the cap 28 attached in place on a burner nozzle assembly, such as that of U.S. Pat. No. 4.705,535, which is depicted in phantom. The burner nozzle assembly, generally indicated by the numeral 10, has a central passageway 12 for an oxygen containing gas, an annular passageway for a liquid (not shown), such as a slurry of comminuted carbonaceous particles in a carrier liquid, such as water, and a frustoconical passageway (not shown) ending in frustoconical surface, which carries additional oxygen-containing gas. These passageways are bounded, respectively, by central conduit, annular conduit, and frustoconical conduit, all as shown in the referenced patent. These conduits are carried in cylindrical burner shell 26. Appropriate spacers, vanes, fins and spiders (not indicated) are used to maintain concentricity of the various conduits and provide as little restriction to fluid flow as possible. Also, the burner shell 26 can carry cooling liquid, such as water. to cool the burner assembly: however, for the sake of simplicity the connections for these, shown in the prior art, are not indicated. Burner shell 26 also encompasses auxilliary fuel gas conduits 27 which are used for start up preheat and maintaining temperatures during periods when slurry is not being fed to the reactor. Also not shown because it is not relevant to the present invention, but available in the incorporated reference, is the structure for the upstream end of the burner assembly 10.

The cap 28 is a part of the protective and cooling tip 40 which prevents thermal and mechanical damage to burner assembly 10. At its upstream end is right cylindrical section 30 which attaches to the burner shell 26, for example by welding, and merges in a smooth curve to a rounded or an elliptical surface 32 at the downstream end. Cap 28 has a central circular discharge orifice 34, which is in axial alignment with the longitudinal central axis of burner nozzle assembly 10 and which is bounded by exit tube 36. Exit tube 36 over fits or attaches to the frustoconical conduit of burner nozzle assembly 10 in leak resistant fashion. This is particularly important because usually the gas liquid system of this two fluid burner nozzle is under pressures from atmospheric to about 3500 psig (24,131.7 kilopascals). If the attachment were not leak resistant, slurry would be lost to the burner shell 26 and taken out with the cooling water, resulting in waste problems, decreased economics, and operating problems. Exit tube 36 has shoulder 38 which supports the heat shield or protective tip, generally indicated at 40. Auxilliary gas conduits 42 are provided to connect with auxilliary fuel gas conduits 27.

Heat shield 40 has liner 44 which at its upstream end is a right cylinder and progressing downstream begins to diverge or flare outwardly from the central longitudinal axis of burner nozzle assembly 10. Liner 44 has a sharp corner 45 which causes the discharged atomized spray to continue the defined divergent pattern and form a conical spray in the combustion zone. This reduces eddy currents which circle back to the burner, causing flame damage to the cap 28. The liner 44 generally flares at an angle of about 5 to about 10° from the longitudinal axis, preferably at about an 8° angle and, considering the entire circumference of the inside of liner 44, would be a 16° angle divergence. However, it has been found that the heat shield preferably should not curve and thin to a great extent, but should maintain straight line divergence so that the flame front is directed out into the combustion zone and not dispersed too much at the nozzle tip 40. If so, eddy currents are more predominant and the oxygen surrounding the fuel mixture tends to react with the gaseous mixture in the combustion zone, such as synthesis gas, and burn immediately adjacent the burner tip, causing hot spots and thermal stress.

As more easily seen in FIGS. 2-7, the liner 44 is held in place by a retaining ring 46 which is an annular structure, similar to a toroidal ring, having interior threads and a chamfered edge 48 which faces shoulder 38. Retaining ring 46 has on its rear surface two spanner holes 50 partially drilled through the retaining ring 46 and located about 180° apart. These are used with a spanner having corresponding lugs for installing the retaining ring on the liner 44. When the retaining ring 46 is installed on the cap 28 a hole 52 is drilled in the rear of the retaining ring 46 on an axis parallel to the longitudinal axis of the burner assembly 10 and in alignment with the threaded joint of the liner 44 and retaining ring 46, such that a locking pin (not shown) placed in the hole 52 prevents the liner 44 and retaining ring 46 from unscrewing and disengaging.

About the outside of the liner 44 there is disposed a compressible and conductive packing material 54 to aid in taking heat away from the liner 44. While the packing material 54 should be heat conductive, it should not conduct heat away too rapidly and create a large temperature difference between the inside and outside surfaces of liner 44, creating large thermal stresses in the process. Packing material 54 should also be compressible so that thermal expansion of liner 44 can be accommodated. Typically, packing material 54 is selected from graphite, metal gauze, tape packing and the like. An especially preferred form of graphite is a tape graphite packing, with a corrugated, flexible graphite ribbon material being especially preferred.

Liner 44 and retaining ring 46 are preferably composed of heat resistant metal alloys. Typical metal alloys which retain their strength at high temperatures are nickel chromium steel alloys. Such alloys have greater strength at temperatures close to their melting points, i.e., about 2400° to about 2500° F. (1298.3°-1353.9° C.). Particularly preferred are Inconel alloys Incoloy 800H, Incoloy 800HT, Type 310 stainless steel, or Incoloy MA956 (Incoloy is a trademark of INCO Alloys International, Inc., Huntington. W. Va.). Additionally, tungsten metal and tungsten alloys with the foregoing materials are useful. Other alloys having similar properties are likewise useful.

Located within conduit 36 of the cap 28, can optionally, be an erosion resistant insert 56 which is employed particularly in the case of using a slurry of comminuted carbonaceous material as the liquid. Because the burner nozzle assembly 10 is set for a particular pressure, any erosion of the insert 56 will affect the shape of the discharge orifice and change the pressure and the atomization and dispersion of the gas liquid mixture. The use of refractory or ceramic inserts, known in the art, but not in the manner of the present invention, such as tungsten carbide, silicon carbide, aluminum nitride, boron carbide and the like, decreases the likelihood of erosion. Insert 56 is supported by gasket or washer 58.

Optionally, an additional cooling feature of the present invention is provided by applying a cooled gas to the space between the liner 44 and cap 28. As shown in FIG. 8, one means for accomplishing gas cooling directly behind liner 44 is provided by bore 60 which can be drilled through the shoulder 38 to a position in conduit 36 downstream of retaining ring 46. A slightly built-up area 62 is provided for attachment of a cooling media supply conduit 64 by any suitable means. The cooling media provided can be any inert or product gas of the system, such as, nitrogen, carbon dioxide, or synthesis gas produced in the gasification reactor.

We claim:

1. A burner nozzle assembly tip in combination with a burner nozzle assembly, said assembly including means for discharge through a discharge orifice and combustion in a combustion zone at relatively high temperature, said tip comprising a cap portion including a central outlet bounded by an exit tube having an upstream portion and a downstream portion and connected at its upstream portion to the discharge orifice and being open to a combustion zone at the downstream portion, said downstream portion flaring outwardly beginning at the location at said opening to a combustion zone to provide a smooth elliptical face ending at the downstream end in a right cylindrical section for attachment to the burner nozzle periphery, said exit tube having a shoulder intermediate an upstream end and the location adjacent said opening to a combustion zone, and a heat shield portion including a thermally resistant metal alloy heat shield having a retaining ring which is located at said shoulder and, in contact therewith and said heat shield comprising a liner connected to said retaining ring and having an upstream end and a downstream end, the upstream end of which has a diameter less than said outlet, said liner diverging outwardly at its downstream end form a central longitudinal axis of said burner nozzle assembly to a diameter larger than said outlet, so that said outlet is partially covered by said liner and protects said outlet from the heat produced by a combustion temperature.

2. The burner nozzle assembly tip of claim 1 further characterized by having a thermally insulating material between said outlet and said liner.

3. The burner nozzle assembly tip of claim 2 in which said thermally insulating material is selected from the group consisting of graphite, metal gauze and tape packing.

4. The burner nozzle assembly tip of claim 3 in which said thermally insulating material is graphite in the form of graphite ribbon.

5. The burner nozzle assembly tip of claim 1 in which said liner and said retaining ring are threadedly connected.

6. The burner nozzle assembly tip of claim 1 in which said retaining ring and liner are composed of a heat resistant alloy.

7. The burner nozzle assembly tip of claim 6 in which said heat resistant alloy is a nickel-chromium-steel alloy.

8. The burner nozzle assembly tip of claim 1 further characterized in that said right cylindrical section of said cap is attached to the burner nozzle assembly at the downstream end thereof and converges a smooth curve to a convex rounded surface culminating in said outlet.

9. The burner nozzle assembly tip of claim 8 in which said cap has at least one fuel gas outlet in the surface having a fuel gas conduit attached thereto.

10. The burner nozzle assembly tip of claim 1 having a cooling gas conduit bore in said shoulder for providing a cooling gas between said outlet conduit and said liner.

* * * * *